United States Patent
Espinosa (10) Patent No.: US 10,921,685 B2
(45) Date of Patent: Feb. 16, 2021

(54) APPARATUS THAT ENABLES THE PHOTOGRAPHING OF HIGHLY REFLECTIVE, OBJECTS WITHOUT REFLECTIONS

(71) Applicant: Erik Espinosa, Parkville, MD (US)

(72) Inventor: Erik Espinosa, Parkville, MD (US)

(*) Notice: Subject to any disclaimer, the term of this patent is extended or adjusted under 35 U.S.C. 154(b) by 0 days.

(21) Appl. No.: 16/706,075

(22) Filed: Dec. 6, 2019

(65) Prior Publication Data

US 2020/0301250 A1   Sep. 24, 2020

Related U.S. Application Data

(63) Continuation-in-part of application No. 16/357,718, filed on Mar. 19, 2019, now Pat. No. 10,578,951.

(51) Int. Cl.
   *G03B 15/06*   (2006.01)
(52) U.S. Cl.
   CPC .................... *G03B 15/06* (2013.01)
(58) Field of Classification Search
   CPC ........................................ G03B 15/12
   USPC ........................................ 396/3–5
   See application file for complete search history.

(56) References Cited

U.S. PATENT DOCUMENTS

| | | | |
|---|---|---|---|
| 2,919,091 A * | 12/1959 | Vander Cook | B01L 9/00 248/124.2 |
| 4,847,663 A | 7/1989 | Query | |
| 6,434,184 B2 * | 8/2002 | Lindsey | H04B 1/7143 375/132 |
| 6,788,886 B2 | 9/2004 | Saigo | |
| 7,041,997 B2 * | 5/2006 | Paradis | G01N 21/8806 250/559.16 |
| 7,386,227 B1 | 6/2008 | Henderson | |
| 7,680,401 B1 | 3/2010 | Adelstein | |
| 7,760,229 B2 | 7/2010 | White | |
| 7,796,869 B2 | 9/2010 | Bakewell | |

(Continued)

FOREIGN PATENT DOCUMENTS

DE       4025538 A1 *   2/1992   ............ G03B 15/06

OTHER PUBLICATIONS

Folding Portable Lightbox Studio at https://www.etsy.com/listing/585437922/folding-portable-lightbox-studio Website printed Mar. 12, 2019 (Year: 2019) (Year: 2019).*

(Continued)

*Primary Examiner* — Clayton E. LaBalle
*Assistant Examiner* — Leon W Rhodes, Jr.
(74) *Attorney, Agent, or Firm* — Larry J. Guffey, Esq.; Oliver & Grimsley, LLC (57) ABSTRACT

An apparatus that enables the photographing of highly reflective, objects placed in it without the reflections of things in the environment surrounding the apparatus being seen in the objects includes: (a) a translucent, planar base, (b) a two-way, domed mirror that has a perimeter edge that defines the mirror's enclosed volume, (c) wherein this base and perimeter edge are adapted so as to allow the perimeter edge to be brought to a closed position proximate to the base so that light from the surrounding environment is prevented from entering the mirror's enclosed volume, and (d) a hinge that is configured to allow the mirror to move between a distal position where its perimeter edge is distal from the base and this closed position where it is proximate the base.

20 Claims, 7 Drawing Sheets

(56) References Cited

U.S. PATENT DOCUMENTS

| | | | |
|---|---|---|---|
| 8,145,048 B2 | 3/2012 | Messier | |
| 8,285,130 B1 | 10/2012 | Lai | |
| 8,368,769 B2 | 2/2013 | Yumiki | |
| 8,430,516 B2 | 4/2013 | Hanabusa | |
| 8,801,190 B2 | 8/2014 | Joseph et al. | |
| 9,952,485 B1 * | 4/2018 | Luski | H04N 5/2252 |

OTHER PUBLICATIONS

Yescom Photo Studio Photography Light Tent at https://www.google.com/shopping/product/16406785518062137263?q=products+to+photograph+reflective+objects&biw=1104&bih=754&prds=paur:ClkAsKraX7_90SeyEmS-AyN5B55wFtx0LrGG7JYUFqCk5GwyVezmWMwZc6O5bmjv6jzXsaCZMsSwiltk7RC-cpGPsF2dc-89KcONfNccT-Cyw_wlsgZtDRi3ghIZAFPVH71XOSUEw0o9P2_ROddxvCb9d-2wCA&sa=X&ved=0ahUKEwjm6qLyxazfAhVHrVkKHZT3BgcQ8wII1QI Website printed Mar. 12, 2019.

Square Table Top Photo Photography Studio Lighting Light Shooting Tent Box Kit at https://tableclothsfactory.com/products/16-square-table-top-photo-photography-studio-lighting-light-shooting-tent-box-kit?variant=46812810703&gclid=CjwKCAiA9efgBRAYEiwAUT-itKArJJp24mRYISrZu0_4D5zY3lz6t25himydTaVkqeFbz1w97eKBBRoC47gQAvD_BwE Website printed Mar. 12, 2019.

Studio Essentials Tabletop Photography Kit at https://www.google.com/shopping/product/10680259469185239273?q=products+to+photograph+reflective+objects&biw=1104&bih=754&prds=paur:ClkAsKraX5y_tkHAUj-sxnvoDO2Sg4mxXU4tLqoxELNTmbjOJhVtg-MwU10twnmm3OMJSz6xtTFyn5BFICDghVcQhqwlwajEr-EnlsV3Na8WwXMyrFnvYQ0JpBIZAFPVH73tFRrIKwMEIpMxz9n3JnQ2eAWPhQ&sa=X&ved=0ahUKEwjm6qLyxazfAhVHrVkKHZT3BgcQ8wII8AI Website printed Mar. 12, 2019.

Amzdeal product at https://www.google.com/shopping/product/8251413552318249896?q=products+to+photograph+reflective+objects&biw=1104&bih=754&prds=paur:ClkAsKraX2p6tAsZvluCV2aFUleuzUK6nSYAuiKv0JuUtE5N-A9GAG-vzOCOkFsi4ZLGIB7FNDnMdavnamjiWcjJYk1cX9mLM1vBL72-YBomnpklqGcDr68U5xIZAFPVH70Jg4HKtbMpzK76Q08aZCw-dbnPHA&sa=X&ved=0ahUKEwjm6qLyxazfAhVHrVkKHZT3BgcQ8wII_gI Website printed Mar. 12, 2019.

Gesswein Small Photo Light box at https://www.gesswein.com/p-12856-gesswein-small-photo-light-box.aspx?gclid=CjwKCAiA9efgBRAYEiwAUT-jtG72-vsBX34tdBEuTdw3PJPBXg3XuuvTTWwL5bEGstFcEPNeMSsz6RoCV3kQAvD_BwE Website printed Mar. 12, 2019.

Smart Light Box Photo Jewelry Coins Product Studio at https://www.bonanza.com/listings/New-Smart-Light-Box-Photo-Jewelry-Coins-Product-Studio/494130886?goog_pla=1&gpid=68416460221&keyword=&goog_pla=1&pos=1o16&ad_type=pla&gclid=CjwKCAiA9efgBRAYEiwAUT-jtIERzohH30cHFlv8FFIEVoqq4pmg1gRzXza7P_BsgfAowzk7otkjxRoCDUwQAvD_BwE Website printed Mar. 12, 2019.

OrangeMonkie Foldio3 product at https://www.google.com/shopping/product/16931220320117487416?q=studio+light+box&biw=1104&bih=754&prds=paur:ClkAsKraXyo3Szj7IQf97Gkvw3Tg9gEBRfiG17IEhy2rsXHUrQd4a-ywRsK5aDdVqbEY5x9O3cXoPhtcAYyvIFJx-RFHBzvysMIB48vRXK1V_u0a3b-N9EMdnhIZAFPVH72kB_j0g-BAuLI5zgYQRENBcuikyg&sa=X&ved=0ahUKEwi9m_-jxqzfAhWkt1kKHWJkCysQ8wIIqQM Website printed Mar. 12, 2019.

* cited by examiner

APPARATUS THAT ENABLES THE PHOTOGRAPHING OF HIGHLY REFLECTIVE, OBJECTS WITHOUT REFLECTIONS

CROSS-REFERENCE TO RELATED APPLICATION

This a Continuation-In-Part Patent Application and claims the benefit of Regular Patent application Ser. No. 16/357,718, filed Mar. 19, 2019 by the present inventor. The teachings of this application are incorporated herein by reference to the extent that they do not conflict with the teaching herein.

BACKGROUND OF THE INVENTION

1. Field of the Invention

The present invention relates generally to photography, and more particularly to a method and apparatus that enables the photographing of highly reflective, table top objects without the reflections of things in the surrounding environment being seen in the highly reflective objects.

2. Description of the Related Art

In the past, taking photographs of highly reflective objects, such as pieces of jewelry, with conventional cameras has often required considerable time and effort to yield pictures that are relatively free of reflections being seen in the objects. Much trial and error was often needed to properly position umbrellas or light diffusion screens and the necessary lighting before a relatively, reflection-free photograph could be achieved.

Highly reflective objects can also frequently cause black spots and shadows in pictures of such objects, as these objects reflect into the camera lens the light used and needed for proper exposure. This exposure light reflection does not allow one to see the detail or highlights of, for example, diamond rings and other jewelry in finished photographs.

Many attempts have been made to come up with inventive solutions that will reduce the time and effort required to yield relatively, reflection-free photographs of is highly reflective objects. For example, U.S. Pat. No. 4,847,663 discloses a method and apparatus to quickly and efficiently photograph highly reflective, table-top objects by utilizing a copy camera and placing a shadow box around the object and covers over the camera parts and between the lights and the object.

U.S. Pat. No. 7,386,227 discloses a method and apparatus for photographic illumination that utilizes a light-diffusing, light box having an aperture in one of its wall and in which is placed an article or articles to be photographed. The method further comprises a means for producing light beams including fiber optics and multiple LEDs, means for varying the number of beams projected onto the photographic subject.

U.S. Pat. No. 8,145,048 discloses a photo booth including a frame defining support members for a plurality of adjacent walls with flexible panels that are light reflective on one side. The photo booth further includes photographic equipment including at least one light for installing in an aperture defined in one of the panels.

See also U.S. Pat. No. 7,796,869, 7,680,401 and 6,788,886.

Despite this prior art, there still continues to be a need for improved methods and apparatus that will reduce the time and effort required to yield relatively, reflection-free photographs of highly reflective objects.

SUMMARY OF THE INVENTION

Recognizing the need for the development of improved methods and apparatus that will reduce the time and effort required to yield relatively, reflection-free photographs of highly reflective objects, the present invention seeks to provide such improved photographic methods and apparatus.

In accordance with a preferred embodiment of the present invention, an apparatus that enables a camera to photograph a highly reflective object which is placed within it, without the reflections of things in the environment surrounding the apparatus being seen in the highly reflective object, and wherein the level of lighting in the surrounding environment does not exceed a specified ambient level, includes: (a) a translucent base having a base inner surface, which has a base center point and top and bottom edges and a centerline that extends between these edges, and a base outer surface, (b) a two-way, domed mirror that has a focal point and an inner surface with a perimeter edge, and wherein the mirror's inner surface encloses a specified, enclosed volume, (c) wherein the translucent base and domed mirror, perimeter edge are adapted so as to allow the mirror's perimeter edge to be brought to a closed position proximate to the base inner surface so that light from the environment surrounding the domed mirror is prevented from entering its enclosed volume, and (d) a hinge that is attached to the domed mirror's perimeter edge and the base's inner surface so as to allow the domed mirror to move between a distal position where its perimeter edge is distal from the base's inner surface and the closed position where its perimeter edge is proximate the base's inner surface.

Another preferred embodiment of the present invention includes a foot that attaches to the base and is configured to orient the base's centerline in a vertical direction.

Yet another preferred embodiment of the present invention further includes a platform that is configured to provide a stage on which a highly reflective object sits when it is placed in the domed mirror's enclosed volume, and a means for adjustably attaching the platform to the base's inner surface.

A still further preferred embodiment of the present invention includes a black or non-reflective mat that has a boundary edge and a central portion with a cutout section having a center point, and wherein this mat has a surface area that is sized so as to enable its boundary edge to extend beyond the domed mirror's perimeter edge when the focal point of the domed mirror is placed proximate the center point of the black mat's cutout section, and wherein this black mat is releasably attached to the base's inner surface so that the center point of the cutout section is proximate the translucent base's center point.

A yet further preferred embodiment of the present invention includes a light source that has an intensity level so that, when light from this source is passed from outside the base's outer surface to illuminate the domed mirror's enclosed volume, the resulting level of the lighting in this enclosed volume is greater than the specified ambient level and causes the inner surface of the two-way, domed mirror to perform as a partially reflective surface and its outer surface to perform as a partially transparent surface.

In a still further preferred embodiment of the present invention, it takes the form of a method that enables a camera to photograph a highly reflective object, when it is placed in an especially configured apparatus, without the reflections of things in the environment surrounding the apparatus being seen in the highly reflective object, and wherein this method includes the steps of: (a) providing a translucent base having a base inner surface, which has a base center point and top and bottom edges and a centerline that extends between these edges, and a base outer surface, (b) providing a two-way, domed mirror that has a focal point and an inner surface with a perimeter edge, and wherein the mirror's inner surface encloses a specified, enclosed volume, (c) wherein the translucent base and domed mirror, perimeter edge are adapted so as to allow the mirror's perimeter edge to be brought to a closed position proximate to the base inner surface so that light from the environment surrounding the domed mirror is prevented from entering its enclosed volume, (d) providing a hinge that is attached to the domed mirror's perimeter edge and the base's inner surface so as to allow the domed mirror to move between a distal position where its perimeter edge is distal from the base's inner surface and the closed position where its perimeter edge is proximate the base's inner surface, (e) ensuring that the level of lighting in the surrounding environment does not exceed a specified ambient level, (f) placing a light source outside the base's outer surface and directing its light through the translucent base so as to illuminate the domed mirror's enclosed volume, and (g) selecting the output of the light source so that the resulting level of the lighting in the domed mirror's enclosed volume is greater than the specified ambient level so as to cause the inner surface of the domed mirror to perform as a partially reflective surface and its outer surface to perform as a partially transparent surface.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 1:
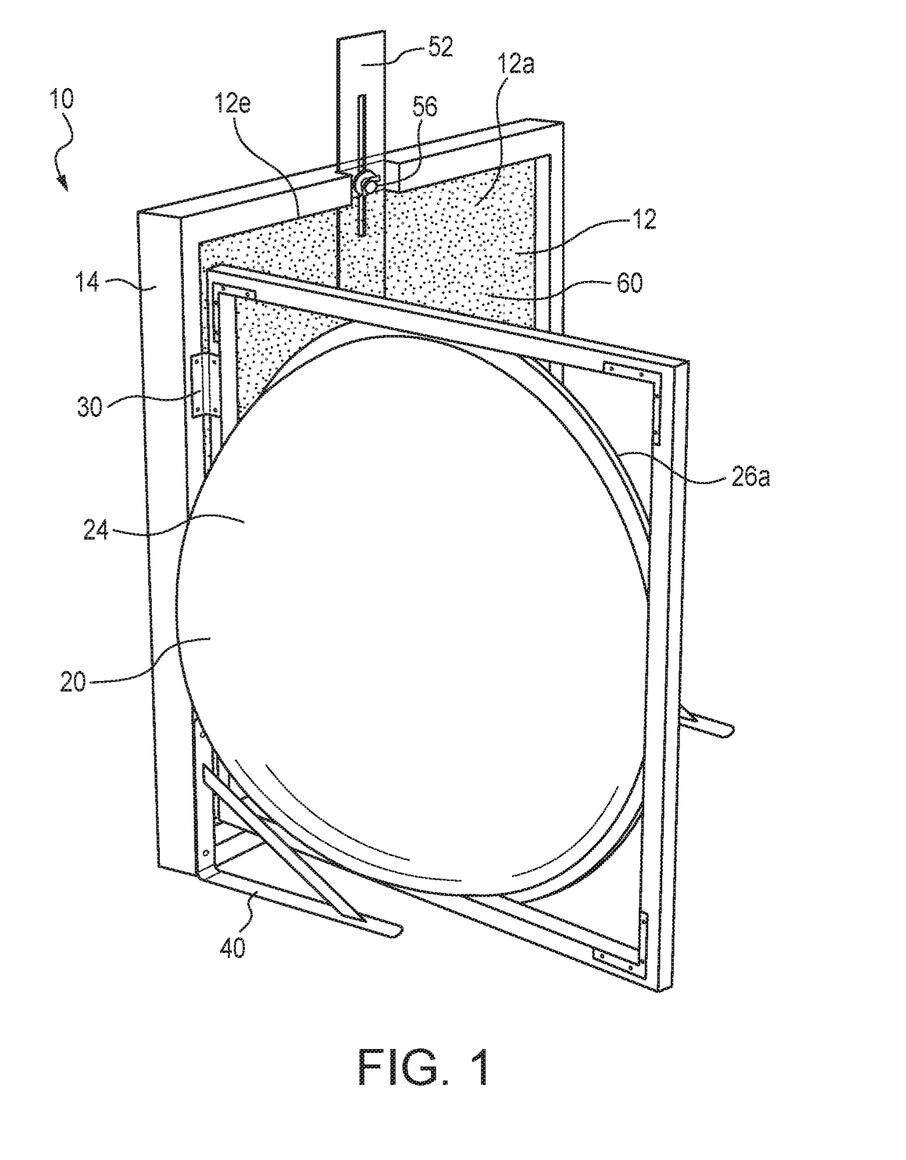
FIG. 1 is a perspective view of a preferred embodiment of the present invention that shows it two-way, domed mirror in an open position and a black mat attached to the translucent base's inner surface. This embodiment doesn't include a light source or any illumination being provided from behind the base; consequently, the two-way mirror's top surface appears reflective rather than transparent as it does when there is sufficient illumination from behind the base.
Figure 2:
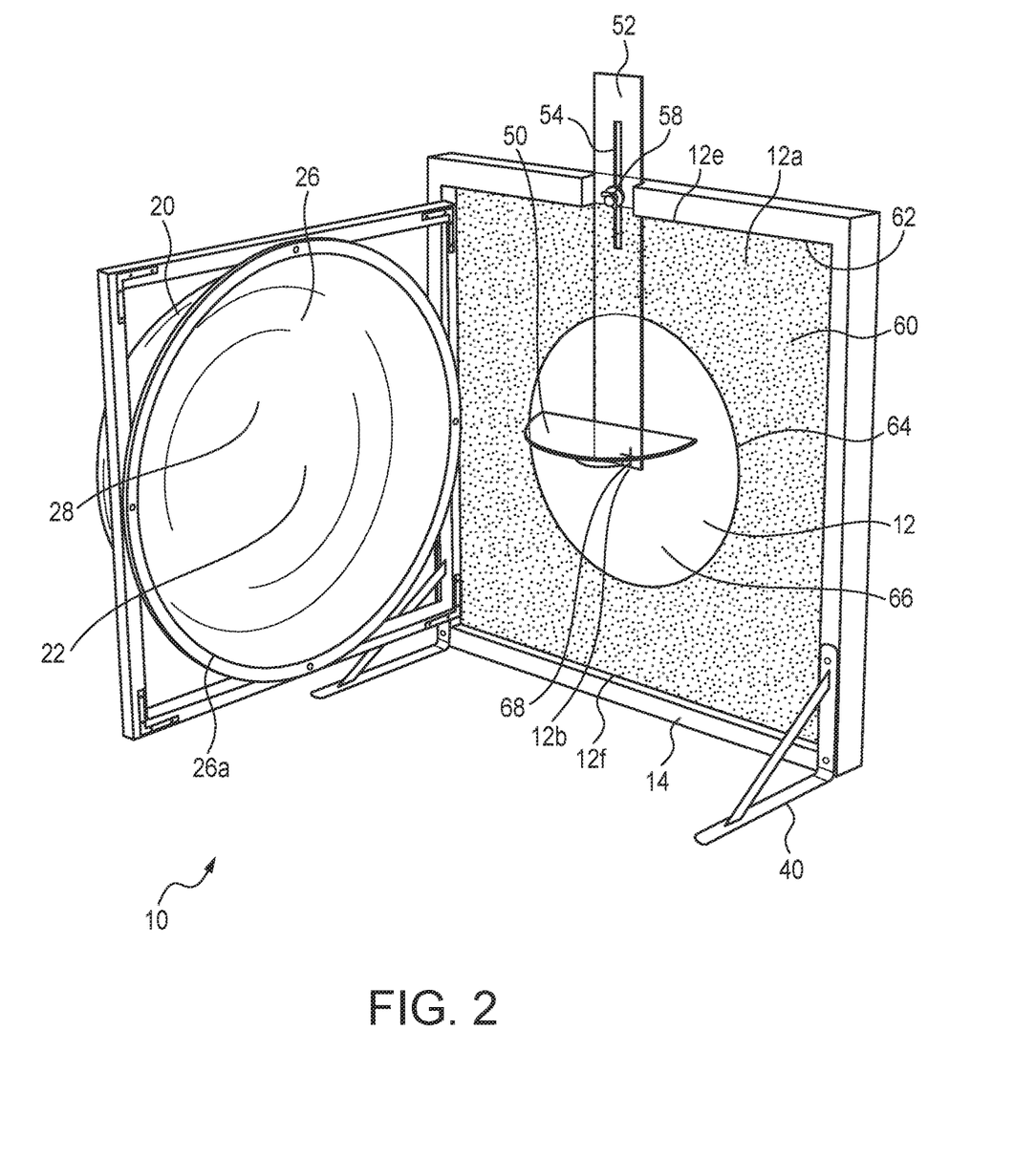
FIG. 2 is a similar perspective view to that shown in FIG. 1 but where the line of sight for this view has been rotated in a horizontal plane approximately 90 degrees counter-clockwise.
Figure 3:
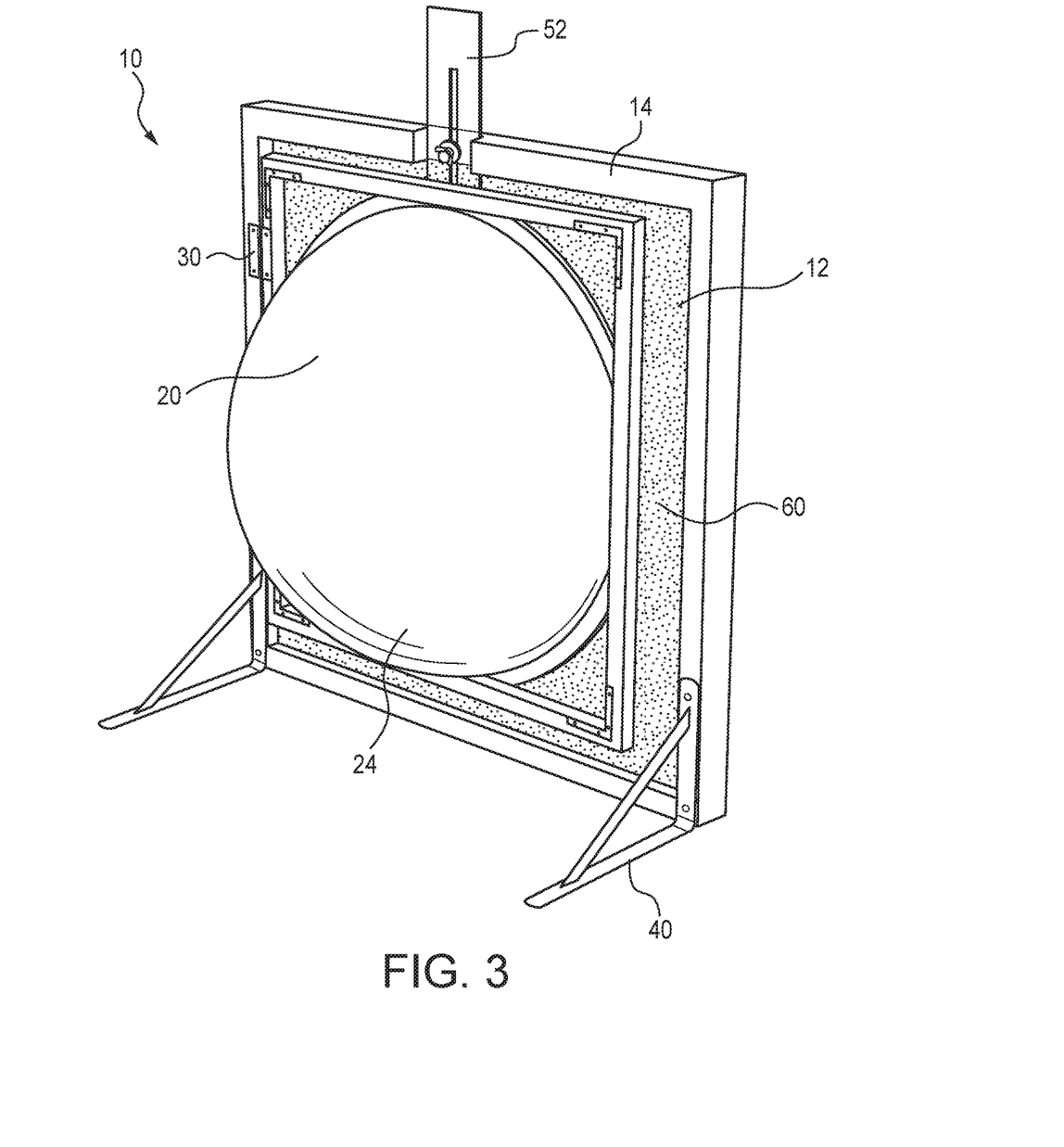
FIG. 3 is a similar perspective view to that shown in FIG. 2 but where the two-way, domed mirror is in a closed position.

Referring to FIGS. 1-3, there is illustrated a perspective view of a preferred embodiment of the present invention 10. In this embodiment, the present invention takes the form of a portable apparatus or enclosure that enables the photographing of highly reflective, table-top-size objects, which are placed in the enclosure, without the reflections of things (e.g., a camera) or people in the environment surrounding the enclosure from being seen in the objects.

For the proper utilization of this enclosure, there is the requirement that the level of background lighting in the environment surrounding the enclosure be generally set at a specified level which is less than that of the various lighting sources that may be needed to adequately light the object which is to be photographed.

This enclosure has a rigid, thin, translucent, planar base 12 which an inner 12a surface with a center point 12b and outer 12c surface. To give one a better idea of the nature of this base, it can be noted that the base shown in FIG. 1 has dimensions of 34 inches by 34 inches, and has a thickness of 0.1875 inches and is identified as a "White Acrylic Sheet, Translucent 32%" and is available from the Falken Design Corporation of New York, N.Y.

Figure 4:
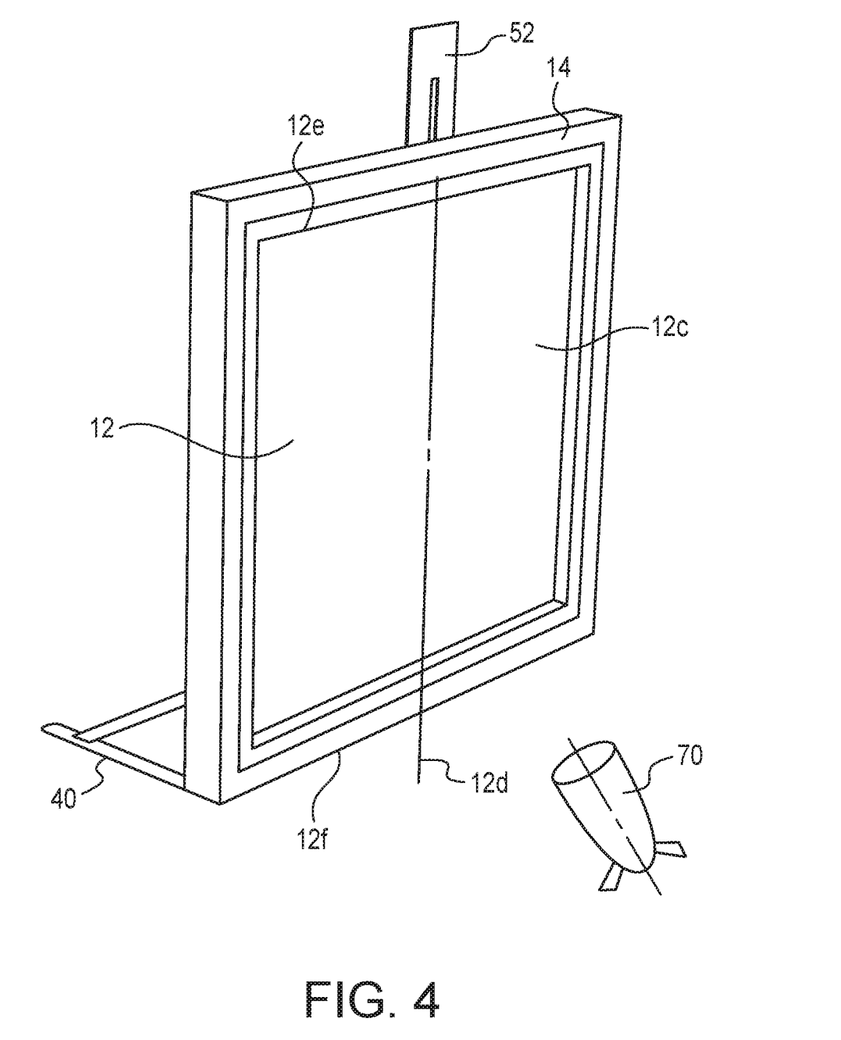
FIG. 4 is a perspective view of a preferred embodiment of the translucent base of the present invention that shows it without a black mat attached to the translucent base's inner surface.

This base is surrounded by a framework 14 that provides a secure surface from which to mount various members that are needed to ideally orient this base so that its centerline 12d, which extends between its top 12e and bottom 12f edges, lies in a vertical plane. The members include an angled member or foot 40 that is attached proximate the framework's bottom edge and oriented in such a manner so that the base's centerline is ideally held in a vertical position. See FIG. 4. However, it should be noted that the present invention can be used with the base's centerline 12d oriented in any preferred orientation.

The present invention also has a thin, two-way, domed mirror 20 that has opposing surfaces that are primarily partially transparent or partially reflective depending upon how these surfaces are being lite. The two-way, domed mirror shown in this application's FIGS. is seen to be half of a spherical surface. However, other types of domed configuration (e.g., an elliptical dome) should be recognized as coming within the scope of the present invention.

This two-way, domed mirror or domed mirror 20 has a focal point 22, an outer 24 surface and an inner surface 26 which has a perimeter edge 26a. This domed mirror's inner surface is seen to enclose a specified, enclosed volume 28. To give one a better idea of the nature of this domed mirror, it can be noted that the mirror shown in this application's FIGS. has a diameter of 30 inches and a thickness of 0.04 inches and is available from "Supreme Tech" of Pekin, Ill.

For the preferred embodiment shown in this application's FIGS., the perimeter edge of its domed mirror is seen to be surrounded by a framework. This framework provides a secure surface on which to mount one side of one or more hinges 30. The other side of these hinges is mounted to the base's framework and consequently these hinges make it possible to easily move the domed mirror from an open position (which allows reflective objects to be placed against the translucent base) to a closed position where the entirety (and not just the portion proximate the hinges) of the domed mirror's perimeter edge is proximate the base's inner surface. In this closed position, there is invariably a small, spatial gap created between the domed mirror's perimeter edge and the base's inner surface and the linear dimension or thickness of this gap is maintained or set such that light from the environment surrounding the domed mirror is effectively prevented from entering through this gap and into the domed mirror's enclosed volume 28.

Figure 5:
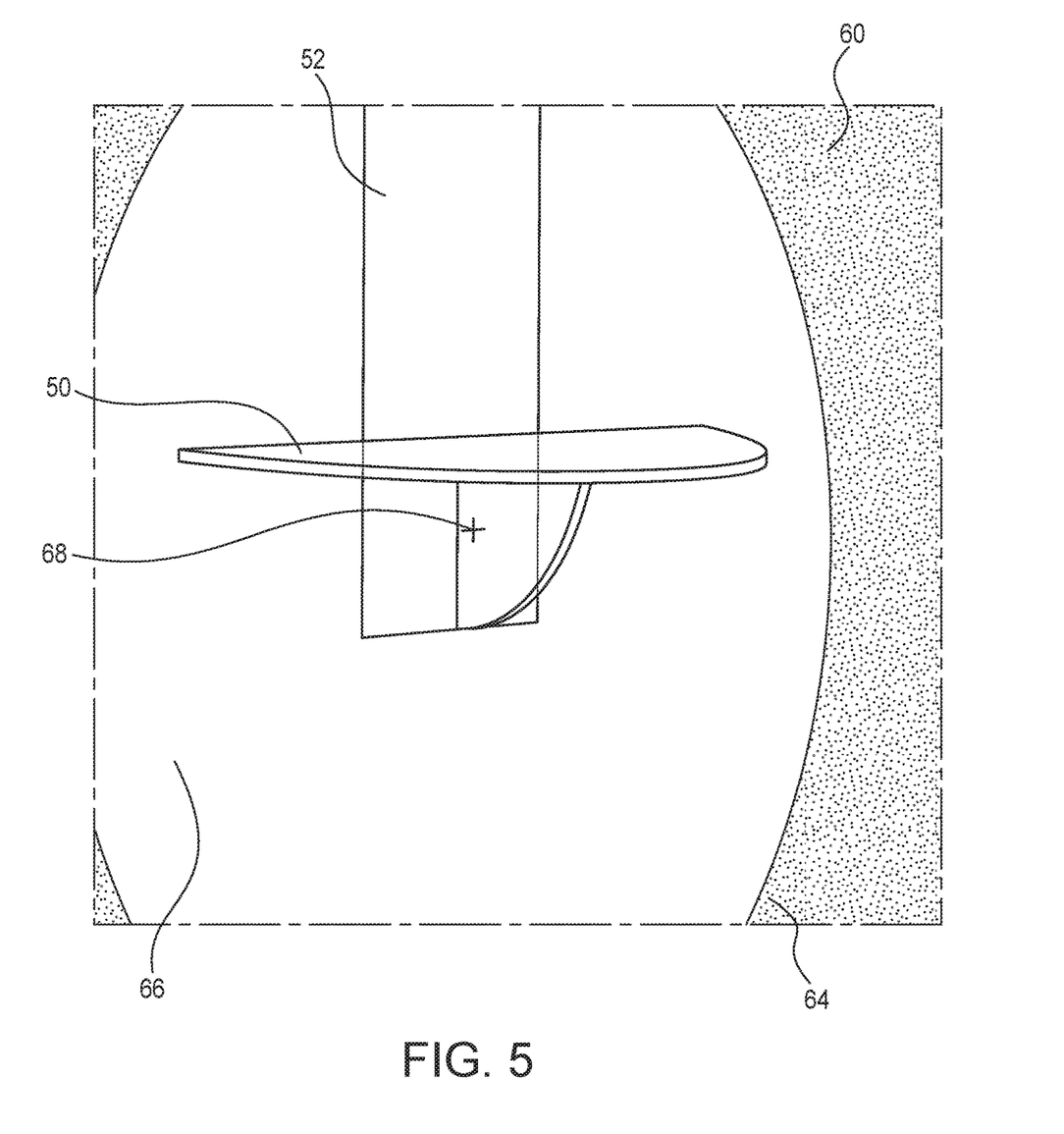
FIG. 5 is a close-up, perspective view of a preferred embodiment of the platform of the present invention that shows it being located near the center of the cutout section in a black mat that is attached to the translucent base's inner surface.

When the translucent base 12 of the present invention is oriented so that its centerline is in a vertical plane, there is a need to provide within the domed mirror's enclosed volume 28 a stage on which a highly reflective object can sit when it is placed in the domed mirror's enclosed volume and the domed mirror is in its closed position. FIG. 5 shows a close-up, perspective view of one means of performing this staging task; it is in the form of a platform 50 that consists of a flat, clear plastic member that has distal and proximal ends and a centerline between these ends. It is oriented so that this platform centerline extends perpendicularly from the translucent base's inner surface. It is held in this position by a vertical member 52 which is aligned against the base's inner surface and has a point near its bottom end attached to a portion of the platform's proximal end.

Figure 6:
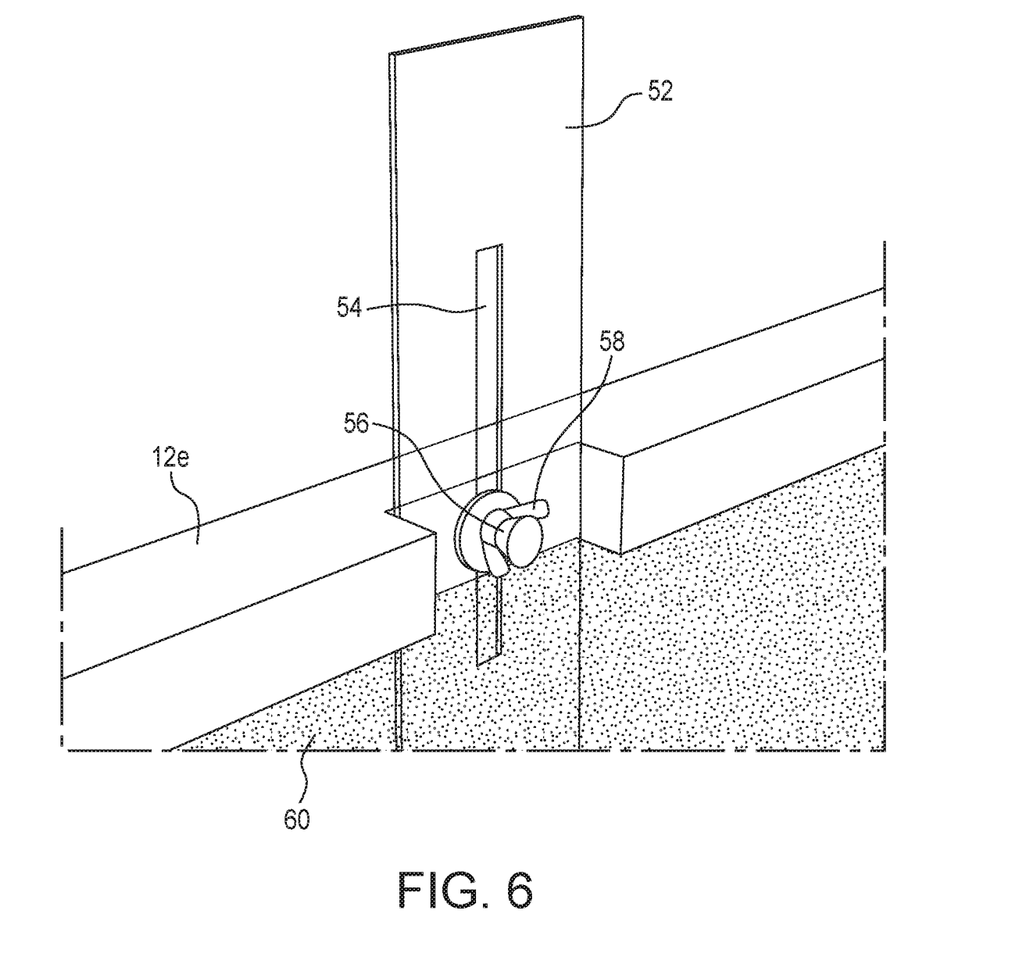
FIG. 6 is a close-up, perspective view of a preferred embodiment of the base's top edge that shows a vertically oriented, slotted member which is attached at its bottom to the platform and at its top end to a threaded member which extends from the base and through the member's slot and with an adjustable, wing nut being screwed onto this threaded member.

FIG. 6 is a close-up, perspective view of the top portion of this vertical member 52 as it is passing through a cutout portion of the framework that adjoins the base's top edge 12e. This portion of the vertical member has a vertically oriented, slot 54 through which extends the free end of a threaded member 56 that projects from the inner surface of the translucent base. After this vertical member is moved up or down with respect to this threaded member in order to position the platform 50 at the desired vertical position within the domed mirror's enclosed volume 28, an adjustable, wing nut 58 or other similar means is screwed or affixed onto this threaded member to compress the portion of the vertical member that lies proximate to it so as to lock the platform in its desired position.

Returning to again look at FIG. 2, it can be seen that an optional, specialized black mat or non-reflective surface 60 is releasably affixed to the inner surface of the translucent base to aid in highlighting the reflective nature of the object that is to be photographed. It can be seen that this black mat has a boundary edge 62 and a central portion 64 with a circular or other desired-shape cutout section 66 which includes a center point 68. For convenience, the boundary edge of the mat shown in FIG. 2 has been configured to extend to the edge of the translucent base. However, for the purpose of the resulting photograph, it is only necessary that the mat have a surface area that is sized so as to enable its boundary edge 62 to extend beyond the perimeter edge 26a of the domed mirror when the domed mirror's focal point 22 is placed proximate the center point 68 of the black mat's cutout section 66. Meanwhile, if the mat's boundary edge does not extend to the base's edge where it's framework would prevent it from being moved to different locations on the base's inner surface, the center point 68 of the mat's cutout section is located so that it is proximate the base's center point 12b. The presence of this black mat with its circular cutout section under the domed mirror results in black lines appearing near the edges of the reflective object that is being photographed which helps to emphasize its reflective nature in the resulting photograph.

The present invention can also include the option of a suitable light source 70 for those instances in which the photographer who is going to use to the present invention does not have such a light source. It must have an intensity level so that, when the light from this light source is passed from outside the outer surface of and through the present invention's base to illuminate the object in the enclosed volume of the domed mirror, the resulting level of the lighting in this enclosed volume is significantly greater than the level of ambient lighting in the surrounding environment so as to make the two-way, domed mirror's inner surface perform as a partially reflective surface while the mirror's outer surface performs as a partially transparent surface so that the object in the enclosed volume is visible and can be adequately photographed without the reflections of things (e.g., a camera) or people in the environment surrounding the enclosure from being seen in the highly reflective object.

Figure 7:
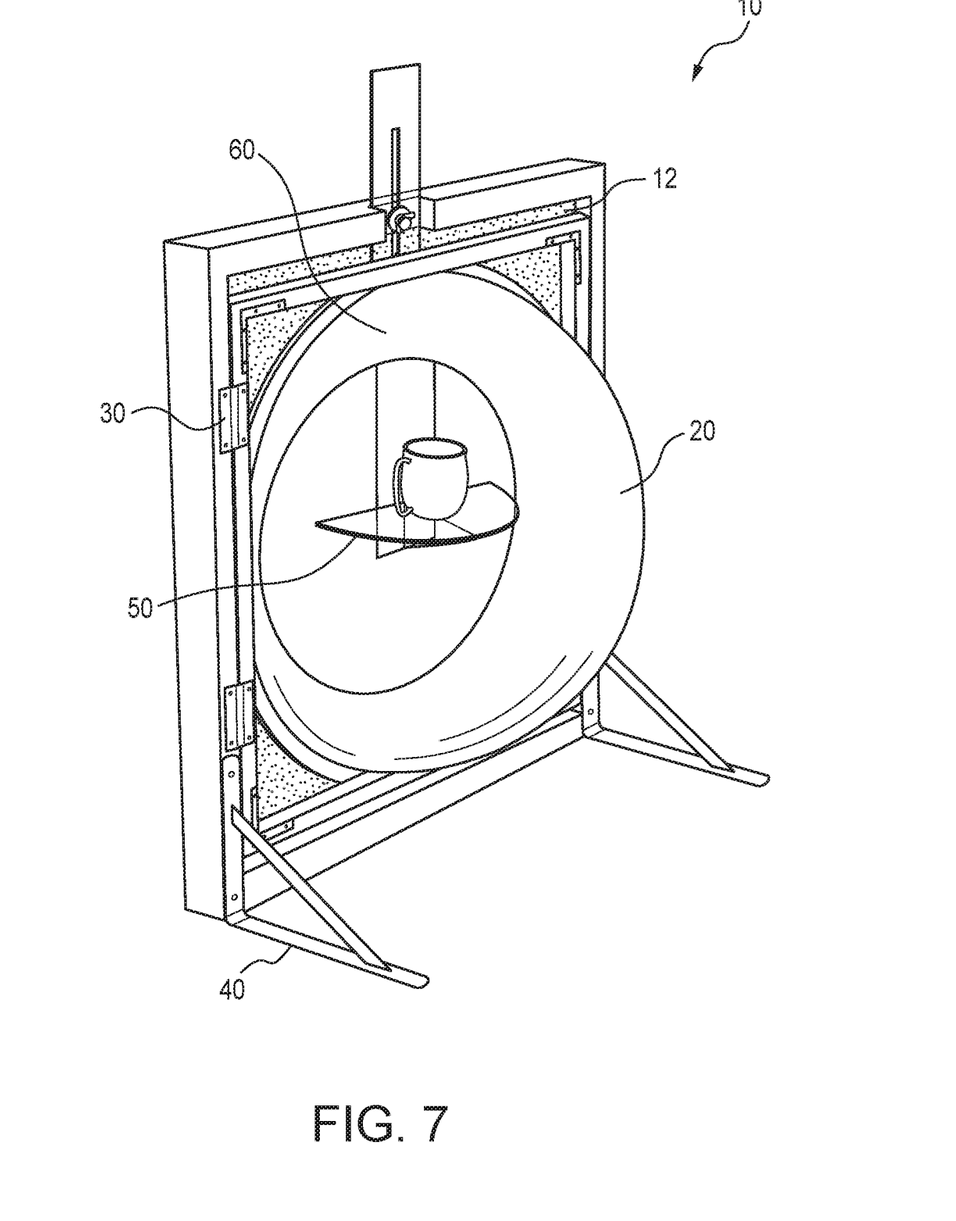
FIG. 7 is a perspective view of a preferred embodiment of the present invention with a cup placed in the domed mirror's enclosed volume and with a light source being used to illuminate this volume from outside the base's outer surface.

To illustrate the use of the present invention, FIG. 7 shows a perspective view of a preferred embodiment of the present invention with a cup placed in the enclosed volume and with a light source 70 being used to illuminate this volume from outside the base's outer surface.

When using the present invention, light sources that have been found to be useful for lighting from outside the base's outer surface when, for example, a silver fork placed in the enclosure include strobe lights, continuous lights (tungsten or LED), and speed flashes.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereinafter set forth in the claims to the invention.

I claim:

1. An apparatus that enables a camera to photograph a highly reflective object which is placed in said apparatus, without the reflections of things in the environment surrounding said apparatus being seen in said highly reflective object, and wherein the level of lighting in said surrounding environment does not exceed a specified ambient level, said apparatus comprising:
 a translucent base having a base inner surface, which has a base center point and top and bottom edges and a centerline that extends between said edges, and a base outer surface,
 a two-way, domed mirror that has a focal point and an inner surface with a perimeter edge, and wherein said inner surface encloses a specified, enclosed volume for said domed mirror,
 wherein said translucent base and said domed mirror perimeter edge are adapted so as to allow said domed mirror perimeter edge to be brought to a closed position proximate to said base inner surface so that a spatial gap is created between said perimeter edge and said inner surface and wherein said gap has a dimension such that light from the environment surrounding said domed mirror is prevented from entering through said gap and into said enclosed volume of said domed mirror, and a hinge that is attached to said domed mirror perimeter edge and said base inner surface and configured to allow said domed mirror to move between a distal position where said perimeter edge is distal from said base inner surface and said closed position where said perimeter edge is proximate said base inner surface.

2. The apparatus as recited in claim 1, further comprising:
a foot that attaches to said base and is configured to orient said base centerline in a vertical direction.

3. The apparatus as recited in claim 2, further comprising:
a platform that is configured to provide a stage on which a highly reflective object is to sit when said highly reflective object is placed in said domed mirror enclosed volume and said domed mirror is in said closed position, and
a means for adjustably attaching said platform to said base inner surface.

4. The apparatus as recited in claim 1, further comprising:
a black mat that has a boundary edge and a central portion with a cutout section with a center point, and wherein said mat has a surface area that is sized so as to enable said boundary edge to extend beyond the perimeter edge of said domed mirror when said focal point of said domed mirror is placed proximate said center point of said cutout section of said black mat, and
wherein said black mat is releasably attached to said base inner surface so that said cutout section center point is proximate said base center point.

5. The apparatus as recited in claim 2, further comprising:
a black mat that has a boundary edge and a central portion with a cutout section with a center point, and wherein said mat has a surface area that is sized so as to enable said boundary edge to extend beyond the perimeter edge of said domed mirror when said focal point of said domed mirror is placed proximate said center point of said cutout section of said black mat, and
wherein said black mat is releasably attached to said base inner surface so that said cutout section center point is proximate said base center point.

6. The apparatus as recited in claim 3, further comprising:
a black mat that has a boundary edge and a central portion with a cutout section with a center point, and wherein said mat has a surface area that is sized so as to enable said boundary edge to extend beyond the perimeter edge of said domed mirror when said focal point of said domed mirror is placed proximate said center point of said cutout section of said black mat, and
wherein said black mat is releasably attached to said base inner surface so that said cutout section center point is proximate said base center point.

7. The apparatus as recited in claim 1, further comprising:
a light source that has an intensity level so that, when light from said source is passed from outside the outer surface of said base to illuminate said domed mirror, enclosed volume, the resulting level of the lighting in said domed mirror enclosed volume is greater than said specified ambient level and causes said inner surface of said two-way, domed mirror to perform as a partially reflective surface and said outer surface of said two-way, domed mirror to perform as a partially transparent surface.

8. The apparatus as recited in claim 2, further comprising:
a light source that has an intensity level so that, when light from said source is passed from outside the outer surface of said base to illuminate said domed mirror, enclosed volume, the resulting level of the lighting in said domed mirror enclosed volume is greater than said specified ambient level and causes said inner surface of said two-way, domed mirror to perform as a partially reflective surface and said outer surface of said two-way, domed mirror to perform as a partially transparent surface.

9. The apparatus as recited in claim 3, further comprising:
a light source that has an intensity level so that, when light from said source is passed from outside the outer surface of said base to illuminate said domed mirror, enclosed volume, the resulting level of the lighting in said domed mirror enclosed volume is greater than said specified ambient level and causes said inner surface of said two-way, domed mirror to perform as a partially reflective surface and said outer surface of said two-way, domed mirror to perform as a partially transparent surface.

10. The apparatus as recited in claim 6, further comprising:
a light source that has an intensity level so that, when light from said source is passed from outside the outer surface of said base to illuminate said domed mirror, enclosed volume, the resulting level of the lighting in said domed mirror enclosed volume is greater than said specified ambient level and causes said inner surface of said two-way, domed mirror to perform as a partially reflective surface and said outer surface of said two-way, domed mirror to perform as a partially transparent surface.

11. A method that enables a camera to photograph a highly reflective object, when said object is placed in an apparatus, without the reflections of things in the environment surrounding said apparatus being seen in said highly reflective object, said method comprising the steps of:
providing a translucent base having a base inner surface, which has a base center point and top and bottom edges and a centerline that extends between said edges, and a base outer surface,
providing a two-way, domed mirror having a domed-shaped configuration that has an inner surface with a focal point and a perimeter edge, and wherein said inner surface encloses a specified, enclosed volume for said domed mirror,
wherein said translucent base and said domed mirror perimeter edge are adapted so as to allow said domed mirror perimeter edge to be brought to a closed position proximate to said base inner surface so that a spatial gap is created between said perimeter edge and said inner surface and wherein said gap has a dimension such that light from the environment surrounding said domed mirror is prevented from entering through said gap and into said enclosed volume of said domed mirror, and
providing a hinge that is attached to said domed mirror perimeter edge and said base inner surface and configured to allow said domed mirror to move between a distal position where said perimeter edge is distal from said base inner surface and said closed position where said perimeter edge is proximate said base inner surface.

12. The method as recited in claim 11, further comprising the step of:
providing a foot that attaches to said base and is configured to orient said base centerline in a vertical direction.

13. The method as recited in claim 12, further comprising the step of:
providing a platform that is configured to provide a stage on which a highly reflective object is to sit when said highly reflective object is placed in said domed mirror enclosed volume and said domed mirror is in said closed position, and
providing a means for adjustably attaching said platform to said base inner surface.

14. The method as recited in claim 11, further comprising the step of:
providing a black mat that has a boundary edge and a central portion with a cutout section with a center point, and wherein said mat has a surface area that is sized so as to enable said boundary edge to extend beyond the perimeter edge of said domed mirror when said focal point of said domed mirror is placed proximate said center point of said cutout section of said black mat, and
wherein said black mat is releasably attached to said base inner surface so that said cutout section center point is proximate said base center point.

15. The method as recited in claim 12, further comprising the step of:
providing a black mat that has a boundary edge and a central portion with a cutout section with a center point, and wherein said mat has a surface area that is sized so as to enable said boundary edge to extend beyond the perimeter edge of said domed mirror when said focal point of said domed mirror is placed proximate said center point of said cutout section of said black mat, and
wherein said black mat is releasably attached to said base inner surface so that said cutout section center point is proximate said base center point.

16. The method as recited in claim 13, further comprising the step of:
providing a black mat that has a boundary edge and a central portion with a cutout section with a center point, and wherein said mat has a surface area that is sized so as to enable said boundary edge to extend beyond the perimeter edge of said domed mirror when said focal point of said domed mirror is placed proximate said center point of said cutout section of said black mat, and
wherein said black mat is releasably attached to said base inner surface so that said cutout section center point is proximate said base center point.

17. The method as recited in claim 11, further comprising the step of:
ensuring that the level of lighting in said surrounding environment does not exceed a specified ambient level,
providing a light source and placing said light source outside the outer surface of said base and directing the light from said light source through said translucent base so as to illuminate said domed mirror, enclosed volume, and
selecting the output of said light source so that the resulting level of the lighting in said domed mirror, enclosed volume is greater than said specified ambient level so as to cause said inner surface of said domed mirror to perform as a partially reflective surface and said outer surface of said domed mirror to perform as a partially transparent surface.

18. The method as recited in claim 12, further comprising the step of:
ensuring that the level of lighting in said surrounding environment does not exceed a specified ambient level,
providing a light source and placing said light source outside the outer surface of said base and directing the light from said light source through said translucent base so as to illuminate said domed mirror, enclosed volume, and
selecting the output of said light source so that the resulting level of the lighting in said domed mirror, enclosed volume is greater than said specified ambient level so as to cause said inner surface of said domed mirror to perform as a partially reflective surface and said outer surface of said domed mirror to perform as a partially transparent surface.

19. The method as recited in claim 13, further comprising the step of:
ensuring that the level of lighting in said surrounding environment does not exceed a specified ambient level,
providing a light source and placing said light source outside the outer surface of said base and directing the light from said light source through said translucent base so as to illuminate said domed mirror, enclosed volume, and
selecting the output of said light source so that the resulting level of the lighting in said domed mirror, enclosed volume is greater than said specified ambient level so as to cause said inner surface of said domed mirror to perform as a partially reflective surface and said outer surface of said domed mirror to perform as a partially transparent surface.

20. The method as recited in claim 16, further comprising the step of:
ensuring that the level of lighting in said surrounding environment does not exceed a specified ambient level,
providing a light source and placing said light source outside the outer surface of said base and directing the light from said light source through said translucent base so as to illuminate said domed mirror, enclosed volume, and
selecting the output of said light source so that the resulting level of the lighting in said domed mirror, enclosed volume is greater than said specified ambient level so as to cause said inner surface of said domed mirror to perform as a partially reflective surface and said outer surface of said domed mirror to perform as a partially transparent surface.

* * * * *